(12) United States Patent
Wang et al.

(10) Patent No.: US 12,344,915 B2
(45) Date of Patent: Jul. 1, 2025

(54) HOT DIP GALVANIZED ULTRA-HIGH STRENGTH STEEL SHEETS WITH HIGH FLATNESS

(71) Applicant: GM GLOBAL TECHNOLOGY OPERATIONS LLC, Detroit, MI (US)

(72) Inventors: Zhou Wang, Shanghai (CN); Zhisong Chai, Liaoning (CN); Wei Xu, Shenyang (CN); Jianfeng Wang, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/364,840

(22) Filed: Aug. 3, 2023

(65) Prior Publication Data

US 2024/0229182 A1    Jul. 11, 2024

(30) Foreign Application Priority Data

Jan. 10, 2023    (CN) .......................... 202310037615.0

(51) Int. Cl.
*C21D 9/46*    (2006.01)
*B32B 15/01*    (2006.01)
(Continued)

(52) U.S. Cl.
CPC .............. *C21D 9/46* (2013.01); *B32B 15/013* (2013.01); *C21D 1/74* (2013.01); *C21D 1/84* (2013.01); *C21D 6/002* (2013.01); *C21D 6/004* (2013.01); *C21D 6/005* (2013.01); *C21D 6/008* (2013.01); *C22C 38/008* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/38* (2013.01); *C22C 38/42* (2013.01); *C22C 38/44* (2013.01); *C22C 38/46* (2013.01); *C22C 38/48* (2013.01);
(Continued)

(58) Field of Classification Search
None
See application file for complete search history.

(56) References Cited

U.S. PATENT DOCUMENTS 10,023,934 B2    7/2018    Shibata et al.
11,255,006 B2    2/2022    Lu et al.
(Continued)

FOREIGN PATENT DOCUMENTS

DE    112009002272 T5    9/2011
DE    102018132901 A1    6/2020
(Continued)

OTHER PUBLICATIONS

Machine translation of Jp 2010-070843A. (Year: 2010).*

*Primary Examiner* — Xiaowei Su (57) ABSTRACT

A coated steel sheet includes a steel sheet comprising iron (Fe); carbon (C) in a range from 0.05% to 0.35 wt. %; manganese (Mn) in a range from 0.1% to less than 2 wt. %; chromium (Cr) in a range from 1.2% to 6.0 wt. %; silicon (Si) in a range from 0.01% to less than 0.6 wt. %; aluminum (Al) in a range from 0.5% to 1.3 wt. %; vanadium (V) in a range from 0.01% to 0.5 wt. %; niobium (Nb) in a range from 0.01% to 0.2 wt. %; and titanium (Ti) in a range from 0.01% to 0.3 wt. %. A zinc coating is formed on an outer surface of the steel sheet.

20 Claims, 5 Drawing Sheets

(51) Int. Cl.

| | |
|---|---|
| *C21D 1/74* | (2006.01) |
| *C21D 1/84* | (2006.01) |
| *C21D 6/00* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/20* | (2006.01) |
| *C22C 38/22* | (2006.01) |
| *C22C 38/24* | (2006.01) |
| *C22C 38/26* | (2006.01) |
| *C22C 38/28* | (2006.01) |
| *C22C 38/38* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/58* | (2006.01) |
| *C23C 2/06* | (2006.01) |
| *C23C 2/40* | (2006.01) |

(52) U.S. Cl.
CPC ............. *C22C 38/50* (2013.01); *C22C 38/58* (2013.01); *C23C 2/06* (2013.01); *C23C 2/40* (2013.01); *C21D 2211/001* (2013.01); *C21D 2211/002* (2013.01); *C21D 2211/005* (2013.01); *C21D 2211/008* (2013.01)

(56) References Cited

U.S. PATENT DOCUMENTS

| | | |
|---|---|---|
| 2011/0168301 A1 | 7/2011 | Song et al. |
| 2014/0234659 A1* | 8/2014 | Kawata .................. C23C 2/06 148/504 |
| 2018/0223385 A1 | 8/2018 | Lu et al. |
| 2020/0063232 A1 | 2/2020 | Lu et al. |
| 2020/0190611 A1 | 6/2020 | Lu et al. |
| 2021/0087661 A1 | 3/2021 | Lu et al. |
| 2021/0187906 A1 | 6/2021 | Lu et al. |
| 2021/0198760 A1 | 7/2021 | Lu et al. |
| 2021/0276065 A1 | 9/2021 | Pang et al. |
| 2023/0140215 A1 | 5/2023 | Lu et al. |
| 2023/0357877 A1 | 11/2023 | Ernst et al. |
| 2023/0383374 A1 | 11/2023 | Wang et al. |

FOREIGN PATENT DOCUMENTS

| | | |
|---|---|---|
| JP | 2010070843 A * | 4/2010 |
| WO | WO-2016106621 A1 | 7/2016 |

* cited by examiner

HOT DIP GALVANIZED ULTRA-HIGH STRENGTH STEEL SHEETS WITH HIGH FLATNESS

CROSS-REFERENCE TO RELATED APPLICATIONS

This application claims the benefit of Chinese Patent Application No. 202310037615.0, filed on Jan. 10, 2023. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a method for producing steel, and more particularly to a method for manufacturing hot dip galvanized ultra-high strength steel sheets with high flatness.

Current zinc-coated ultra-high strength steel (UHSS) is hardened by water quenching. Cooling using water quenching causes temperature gradients in the steel. As a result, water quenching causes distortion and reduces sheet flatness. Poor sheet flatness causes low roll forming efficiency, which increases cost. Water quenching is also incompatible with continuous galvanizing production lines (CGL).

SUMMARY

A coated steel sheet includes a steel sheet comprising iron (Fe); carbon (C) in a range from 0.05% to 0.35 wt. %; manganese (Mn) in a range from 0.1% to less than 2 wt. %; chromium (Cr) in a range from 1.2% to 6.0 wt. %; silicon (Si) in a range from 0.01% to less than 0.6 wt. %; aluminum (Al) in a range from 0.5% to 1.3 wt. %; vanadium (V) in a range from 0.01% to 0.5 wt. %; niobium (Nb) in a range from 0.01% to 0.2 wt. %; and titanium (Ti) in a range from 0.01% to 0.3 wt. %. A zinc coating is formed on an outer surface of the steel sheet.

In other features, a sum of a weight of the manganese (Mn) and 3 times a weight of the silicon Si is less than 5 wt. %. A sum of a weight of the aluminum (Al) and the silicon (Si) is greater than 1.0 wt. %.

In other features, the coated steel sheet includes one or more materials selected from a group consisting of tin (Sn), copper (Cu), molybdenum (Mo), and/or nickel (Ni). The tin (Sn) is less than 0.1 wt. %, the copper (Cu) is less than 0.5 wt. %, the molybdenum (Mo) is less than 0.5 wt. %, and/or the nickel (Ni) is less than 0.5 wt. %.

A coated steel sheet includes a steel sheet comprising iron (Fe); carbon (C) in a range from 0.05% to 0.35 wt. %; manganese (Mn) in a range from 0.1% to less than 2 wt. %; chromium (Cr) in a range from 1.2% to 6.0 wt. %; silicon (Si) in a range from 0.5% to 1.3 wt. %; aluminum (Al) in a range from 0.01% to less than 0.6 wt. %; vanadium (V) in a range from 0.01% to 0.5 wt. %; niobium (Nb) in a range from 0.01% to 0.2 wt. %; and titanium (Ti) in a range from 0.01% to 0.3 wt. %. A zinc coating is formed on outer surfaces of the steel sheet.

In other features, a sum of a weight of the manganese (Mn) and 3 times a weight of the silicon Si is less than 5 wt. %. A sum of a weight of the aluminum (Al) and the silicon (Si) is greater than 1.0 wt. %.

In other features, the coated steel sheet includes one or more materials selected from a group consisting of tin (Sn), copper (Cu), molybdenum (Mo), and/or nickel (Ni). The tin (Sn) is less than 0.1 wt. %, the copper (Cu) is less than 0.5 wt. %, the molybdenum (Mo) is less than 0.5 wt. %, and/or the nickel (Ni) is less than 0.5 wt. %.

A method of manufacturing a hot dip galvanized high strength steel sheet includes heating a steel sheet to a temperature in a predetermined range from 800° C. to 950° C. for a soaking period. The steel sheet comprises one of a first composition and a second composition. The first composition comprises iron (Fe), carbon (C) in a range from 0.05% to 0.35 wt. %, manganese (Mn) in a range from 0.1% to less than 2 wt. %, chromium (Cr) in a range from 1.2% to 6.0 wt. %; silicon (Si) in a range from 0.01% to less than 0.6 wt. %; aluminum (Al) in a range from 0.5% to 1.3 wt. %; vanadium (V) in a range from 0.01% to 0.5 wt. %; niobium (Nb) in a range from 0.01% to 0.2 wt. %; and titanium (Ti) in a range from 0.01% to 0.3 wt. %. The second composition comprises iron (Fe), carbon (C) in a range from 0.05% to 0.35 wt. %, manganese (Mn) in a range from 0.1% to less than 2 wt. %, chromium (Cr) in a range from 1.2% to 6.0 wt. %, silicon (Si) in a range from 0.5% to 1.3 wt. %, aluminum (Al) in a range from 0.01% to less than 0.6 wt. %, vanadium (V) in a range from 0.01% to 0.5 wt. %, niobium (Nb) in a range from 0.01% to 0.2 wt. %, and titanium (Ti) in a range from 0.01% to 0.3 wt. %. After the soaking period, the method includes cooling the steel sheet using gas cooling having a cooling rate in a predetermined range from 2° C./s to 15° C./s to a first predetermined temperature less than or equal to a second predetermined temperature. The method includes hot dip galvanizing the steel sheet at the second predetermined temperature to form a zinc coating.

In other features, the soaking period is in a range from 1 s to 10 ks. The soaking period is in a range from 200 s to 500 s. Heating the steel sheet is performed in an atmosphere selected from a group consisting of molecular nitrogen ($N_2$), and a mixture of $N_2$ and molecular hydrogen $H_2$.

In other features, the first predetermined temperature is equal to the second predetermined temperature. The first predetermined temperature is less than the second predetermined temperature. The first predetermined temperature is in a range from 250° C. to 400° C. After gas cooling, the method includes heating the steel sheet to the second predetermined temperature.

In other features, a sum of a weight of the manganese (Mn) and 3 times a weight of the silicon Si is less than 5 wt. %. A sum of a weight of the aluminum (Al) and the silicon (Si) is greater than 1.0 wt. %.

In other features, a microstructure of the steel sheet comprises martensite in a range from 70-99 vol. %, austenite in a range from 3-20 vol. %, bainite in a range from 0-20 vol. %, ferrite in a range from 0-10 vol. %, and Cr-enriched carbide in a range from 0.1% to 10 vol. %.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure relates to methods for manufacturing hot dip galvanized (HDG) ultra-high strength steel (UHSS) sheets with high flatness. In some examples, the HDG UHSS sheets are continuous sheets that are manufactured using a continuous galvanizing line (CGL).

The HDG UHSS sheets are enabled by several compositions including added chromium (Cr). The HDG UHSS sheets can be used for making automotive roll-formed components requiring both high strength and corrosion resistance. Hardening is performed by gas cooling compatible with CGL and enabled by Cr addition. The HDG UHSS sheets have improved galvanizability due to reduced manganese (Mn) and silicon (Si) and increases Cr and aluminum (Al). The HDG UHSS sheet has improved strength and toughness due to microstructures with retained austenite.

Figure 1:
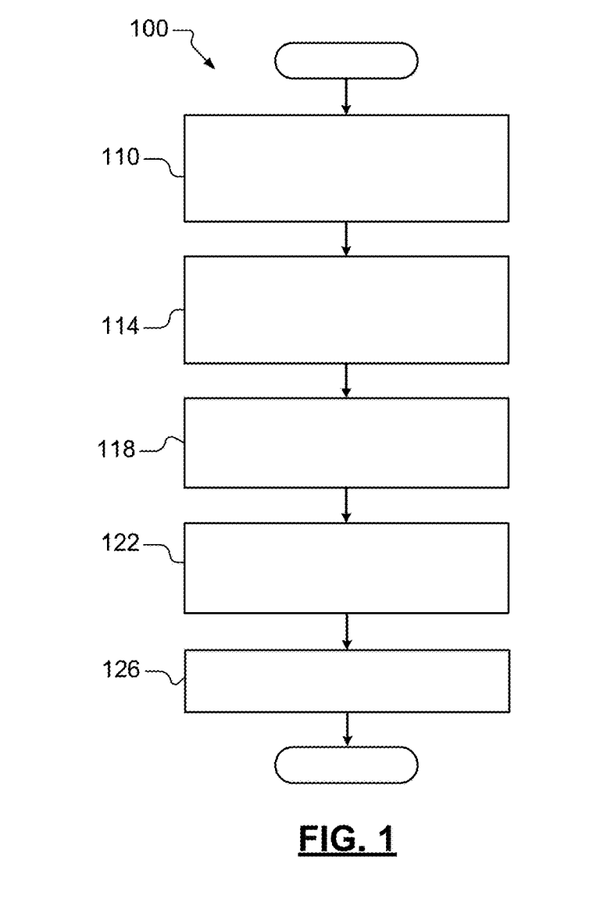
FIG. 1 is a flowchart of an example of a method for manufacturing hot dip galvanized UHSS according to the present disclosure.

Referring now to FIG. 1, a method 100 for manufacturing hot dip galvanized UHSS sheet is shown. At 110, the UHSS sheet is heated to a predetermined temperature in a predetermined range. In some examples, the predetermined temperature is above an austenite temperature (or Ac3). In some examples, the predetermined temperature is in a range from 800 to 950° C.

In some examples, the UHSS sheet soaks for a predetermined period in a range from 1 s to 10 kilo seconds (ks). In some examples, the predetermined period is in a range from 200 s to 500 s. In some examples, the heating is performed in a protective atmosphere. In some examples, the protective atmosphere includes molecular nitrogen ($N_2$) or a mixture of $N_2$ and molecular hydrogen $H_2$ (e.g., 5% by volume).

At 114, the UHSS sheet is gas cooled using a quenching rate in a predetermined range from 2° C./s to 15° C./s to a temperature less than or equal to a predetermined temperature. In some examples, the predetermined temperature is less than or equal to a hot dip galvanizing temperature. In some examples, the gas used for gas cooling includes air, or molecular nitrogen ($N_2$) or a mixture of $N_2$ and molecular hydrogen $H_2$ (e.g., 5% by volume). In some examples, the predetermined temperature is less than 500° C.

At 118, the UHSS sheet is optionally heated to a predetermined temperature. When the temperature of the UHSS sheet is reduced using gas cooling to the hot dip galvanizing temperature, heating may be omitted. In other words, the UHSS sheets can be quenched by the gas cooling directly to hot dip galvanizing temperature. Alternately, the UHSS sheets can be quenched by the gas cooling to a temperature below the galvanizing temperature (e.g., below the martensite point between 250° C. to 400° C.) and then reheated to the galvanizing temperature before hot dip galvanizing.

At 122, the UHSS sheet is hot dip galvanized to form a zinc (Zn) coating on outer surfaces of the UHSS sheet. For example, the UHSS sheet is dipped for a predetermined period in a zinc pot heated to the hot dip galvanizing temperature. In some examples, the hot dip galvanizing temperature is in a range from 430° C. to 560° C. In some examples, the predetermined period is in a range from 1 s to 100 s (e.g., 1 s to 10 s). At 126, the UHSS sheet is quenched to room temperature.

In some examples, a chemical composition of the zinc pot comprises zinc (Zn). In some examples, the Zn has a purity greater than 99% and is heated to a temperature in a range from 450° C. to 470° C. In other examples, a mixture of zinc (Zn), aluminum (Al), and magnesium (Mg) is heated to a temperature in a temperature range from 500° C. to 550° C. The Zn—Al—Mg produces better galvanizability, ductility, and bendability with somewhat lower strength.

In some examples, the UHSS sheets have a first composition including iron (Fe), carbon (C) in a range from 0.05% to 0.35 wt. %, manganese (Mn) in a range from 0.1% to less than 2 wt. %, chromium (Cr) in a range from 1.2% to 6.0 wt. %, silicon (Si) in a range from 0.01% to less than 0.6 wt. %, aluminum (Al) in a range from 0.5% to 1.3 wt. %, vanadium (V) in a range from 0.01% to 0.5 wt. %, niobium (Nb) in a range from 0.01% to 0.2 wt. %, and titanium (Ti) in a range from 0.01% to 0.3 wt. %.

In some examples, a sum of Mn and 3*Si is less than 5 wt. % for galvanizability. In some examples, a sum of Al and Si is greater than 1.0 wt. % for retained austenite. In some examples, the first composition further includes tin (Sn), copper (Cu), molybdenum (Mo), and/or nickel (Ni) to enhance galvanizability. In some examples, Sn is less than 0.1 wt. %, Cu is less than 0.5 wt. %, Mo is less than 0.5 wt. %, and/or Ni is less than 0.5 wt. %.

In some examples, the UHSS sheets have a second composition including iron (Fe), carbon (C) in a range from 0.05% to 0.35 wt. %, manganese (Mn) in a range from 0.1% to less than 2 wt. %, chromium (Cr) in a range from 1.2% to 6.0 wt. %, silicon (Si) in a range from 0.5% to 1.3 wt. %, aluminum (Al) in a range from 0.01% to less than 0.6 wt. %, vanadium (V) in a range from 0.01% to 0.5 wt. %, niobium (Nb) in a range from 0.01% to 0.2 wt. %, and titanium (Ti) in a range from 0.01% to 0.3 wt. %.

In some examples, a sum of Mn and 3*Si is less than 5 wt. % for galvanizability. In some examples, a sum of Al and Si is greater than 1.0 wt. % for retained austenite. In some examples, the second composition further includes tin (Sn), copper (Cu), molybdenum (Mo), and/or nickel (Ni). In some examples, Sn is less than 0.1 wt. %, Cu is less than 0.5 wt. %, Mo is less than 0.5 wt. %, and/or Ni is less than 0.5 wt. %.

The UHSS sheets have improved galvanizability due in part to the replacement of Mn and Si with Cr and Al. The UHSS sheets also have improved strength and toughness via a microstructure with retained austenite.

In some examples, the microstructure of the UHSS sheets is martensite in a range from 70-99 vol. %, retained austenite in a range from 3-20 vol. %, bainite in a range from 0-20 vol. %, ferrite in a range from 0-10 vol. %, and Cr-enriched carbide in a range from 0.1% to 10 vol. %. In some examples, the Cr-enriched carbide includes Cr in a range from 10% to 51 wt. % and carbon (C) in a range from 49 to 90 wt. %. In some examples, the carbide size is in a range from 25 nm to 400 μm.

In some examples, the hot galvanized UHSS sheets have a yield strength greater than 1000 MPa, an ultimate tensile strength greater than 1500 MPa, total elongation greater than 6%, and VDA bending angle greater than 50°.

The hot dip galvanized (HDG) UHSS sheets can be produced using a continuous galvanizing line with high flatness. In some examples, the process is enabled using gas cooling and by the chemical compositions that include chromium. In some examples, the steel sheets are used for making automotive roll-formed components requiring both high strength and corrosion resistance.

Figure 2:
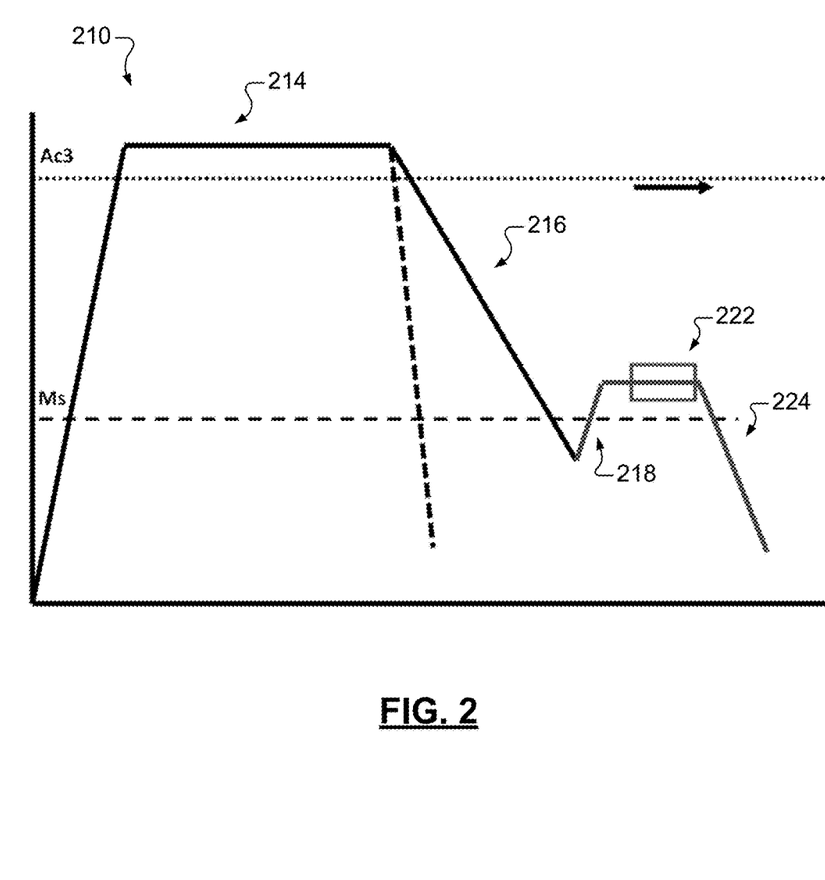
FIG. 2 is a graph illustrating an example of a method for manufacturing hot dip galvanized UHSS according to the present disclosure.

Referring now to FIG. 2, a method 210 is shown for manufacturing hot dip galvanized UHSS sheets. The temperature of the UHSS sheet is increased above an austenite temperature (Ac3) and soaked at 214 for a predetermined period. The reduced Mn and Si (as compared to prior processes) reduces oxide coverage during high temperature soaking.

Then, the UHSS sheet is gas cooled at a predetermined cooling rate. In some examples, hardening by gas cooling is enabled by the addition of chromium. If the UHSS sheet is cooled below the galvanization temperature, the UHSS sheet can be heated to the hot dip galvanization temperature at 218. When the hot dip galvanization temperature is reached, the UHSS sheet is galvanized at 222 and then quenched to room temperature at 224.

Figure 3:
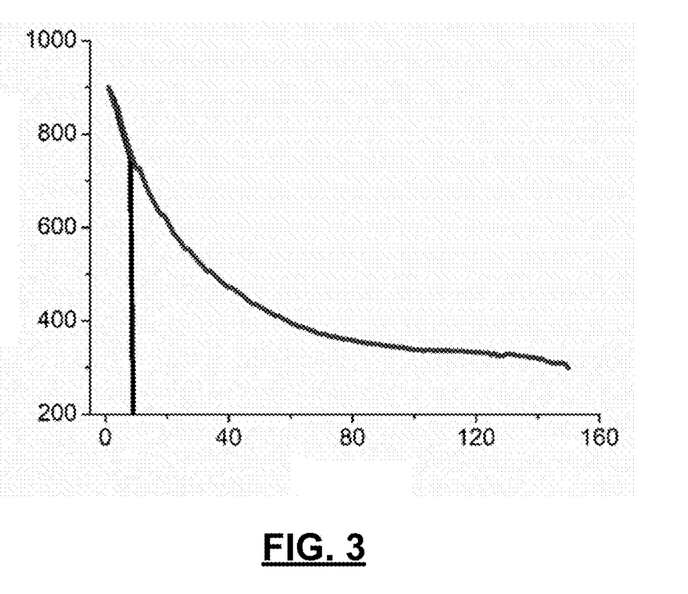
FIG. 3 is a graph illustrating examples of temperature as a function of time for water quenching and gas cooling of UHSS sheets.
Figure 4:
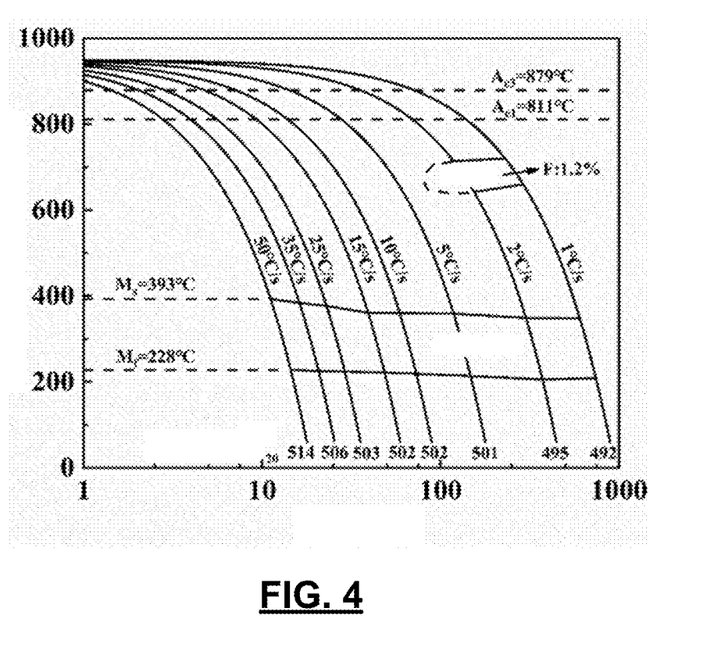
FIG. 4 is a graph illustrating the effects of various cooling rates when manufacturing hot dip galvanized UHSS according to the present disclosure.

Referring now to FIGS. 3 and 4, the gas cooling rate controls the phase of the UHSS sheets. In FIG. 3, a graph illustrates temperature as a function of time for water quenching and gas quenching. In FIG. 4, a graph illustrates examples of various gas cooling rates relative to ferrite or martensite phases.

The very fast quenching via water quenching (e.g., about 550° C./s) is hard to stop accurately at the hot dip galvanizing temperature. In contrast, gas cooling (e.g., about 6-7° C./s from 700° C. to 400° C.) can be controlled and interrupted between 200° C. and 500° C. for continuous galvanization. Gas cooling also allows improved flatness, which increases roll forming efficiency and avoids frequent tool adjustment. The controlled gas cooling rate produces the martensite phase for high strength. In some examples, the gas cooling rate is less than 5° C./s due to Cr addition.

Figure 5:
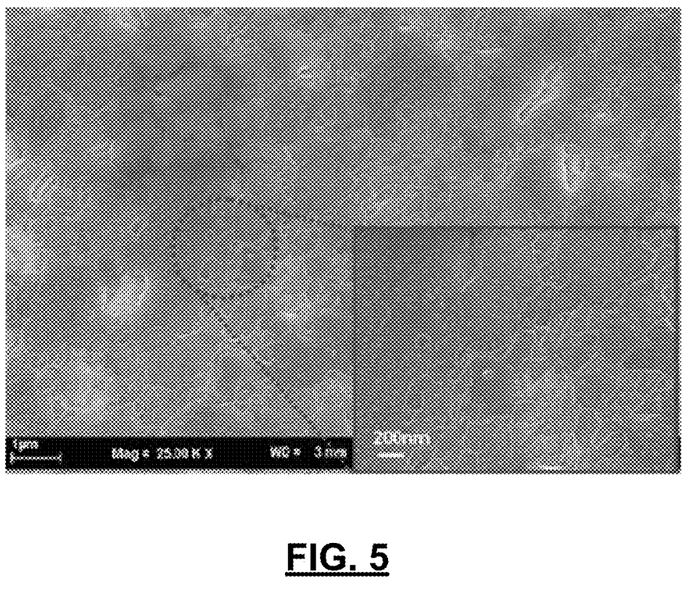
FIGS. 5 and 6 are magnified images of examples of UHSS sheets with different silicon levels.
Figure 6:
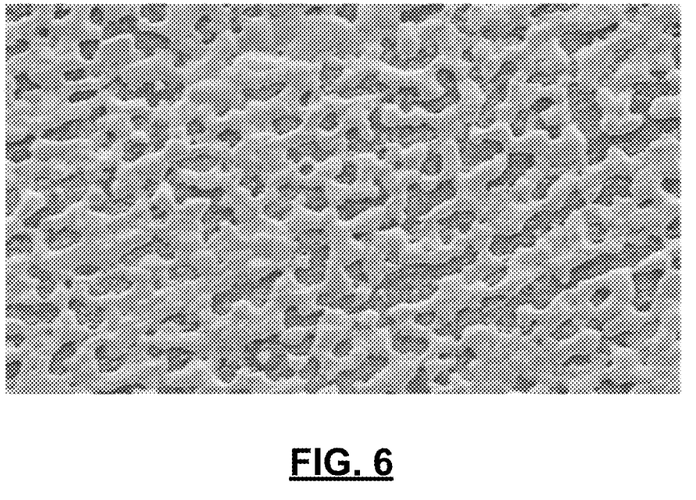

Referring now to FIGS. 5 and 6, magnified images of examples of UHSS sheets with different silicon levels are shown. The magnified images are shown in Frenznick S, Swaminathan S, Stratmann M, Rohwerder M., "A novel approach to determine high temperature wettability and interfacial reactions in liquid metal/solid interface," Journal of Materials Science, 2010 April 45(8), 2106-11. In FIG. 5, a sample with reduced Si (e.g., 0.25% wt. Si) is shown. In FIG. 6, a sample with a higher level of Si (e.g., 1.5% wt. Si) is shown. The sample in FIG. 6 shows increased silicon oxides. The coverage of Si, Mn, or Si—Mn oxides negatively influence the wettability of Zn at the steel surface, thus reducing galvanizability.

Figures 7, 8, 9:
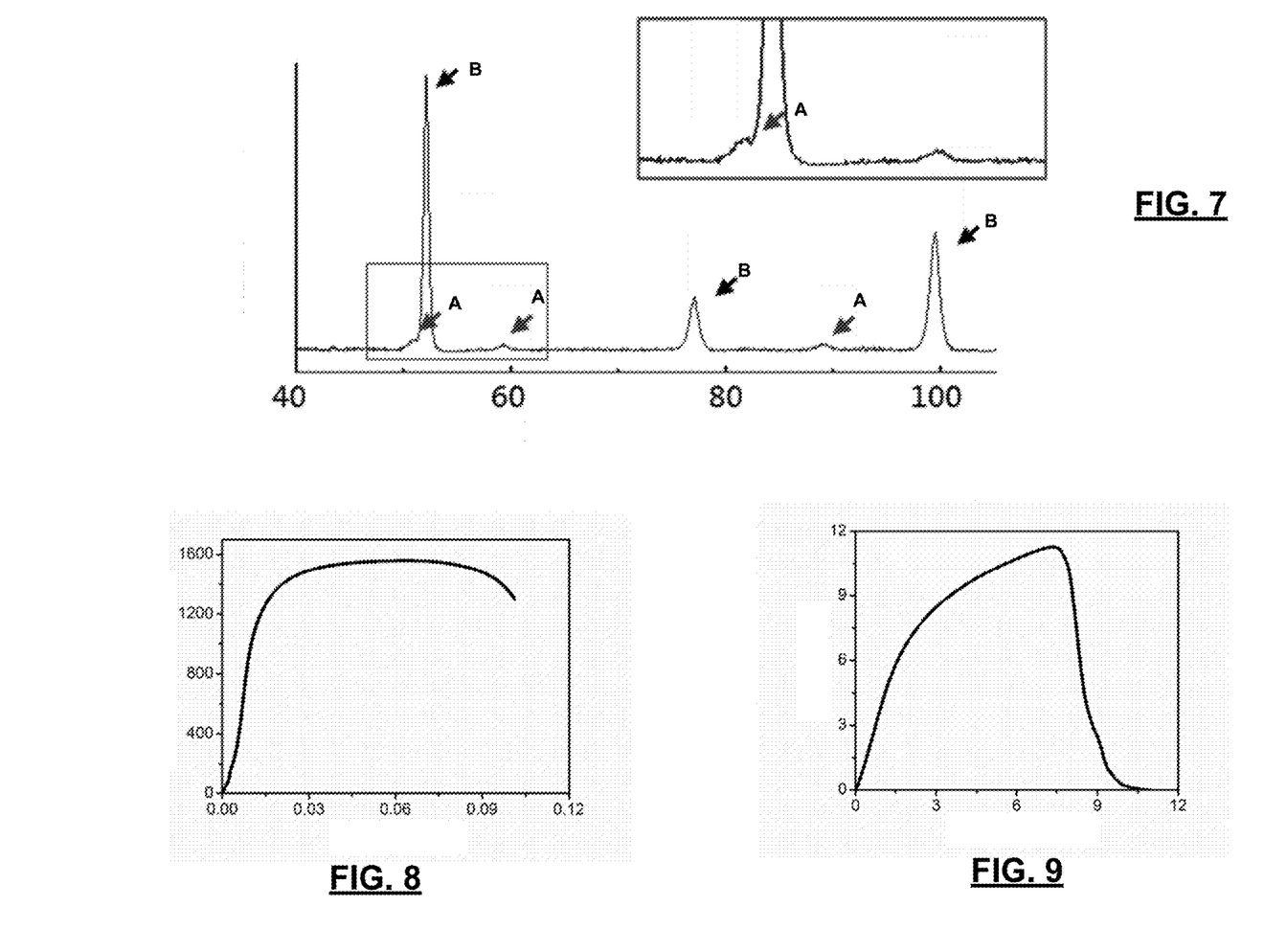
FIG. 7 is a graph illustrating an example of x-ray diffraction intensity as a function of 2Theta.
FIG. 8 shows an example of tensile stress as a function of tensile strain for UHSS sheets according to the present disclosure.
FIG. 9 show examples of load as a function of extension during a bending test for UHSS sheets according to the present disclosure.

Referring now to FIG. 7, a graph illustrating an example of x-ray diffraction intensity as a function of 2Theta is shown. Austenite is shown at A and ferrite, bainite and martensite are shown at B. The hot dip galvanizing process simultaneously tempers the martensite structure and/or stabilizes retained austenite by carbon partitioning. As can be seen in FIG. 7, retained austenite (e.g., >3 vol %) is shown using an X-ray diffraction technique.

Referring now to FIGS. 8 and 9, tensile and bendability properties of the UHSS sheets according to the present disclosure are shown. In FIG. 8, tensile stress of a sample is shown as a function of tensile strain. In this example, the UHSS steel has a yield strength of 1207 MPa±5.6 MPa, ultimate tensile strength of 1550 MPa±16 MPa, and total elongation (TEL) of 9.7±0.4%. In FIG. 9, load in kilonewtons (kN) is shown as a function of extension in millimeters (mm) during a bending test (e.g., industrial standard VDA 238-100). In this example, the UHSS sheet has a peak force of 11.25 kN and a bending angle of 62.61±0.4°.

Figure 10:
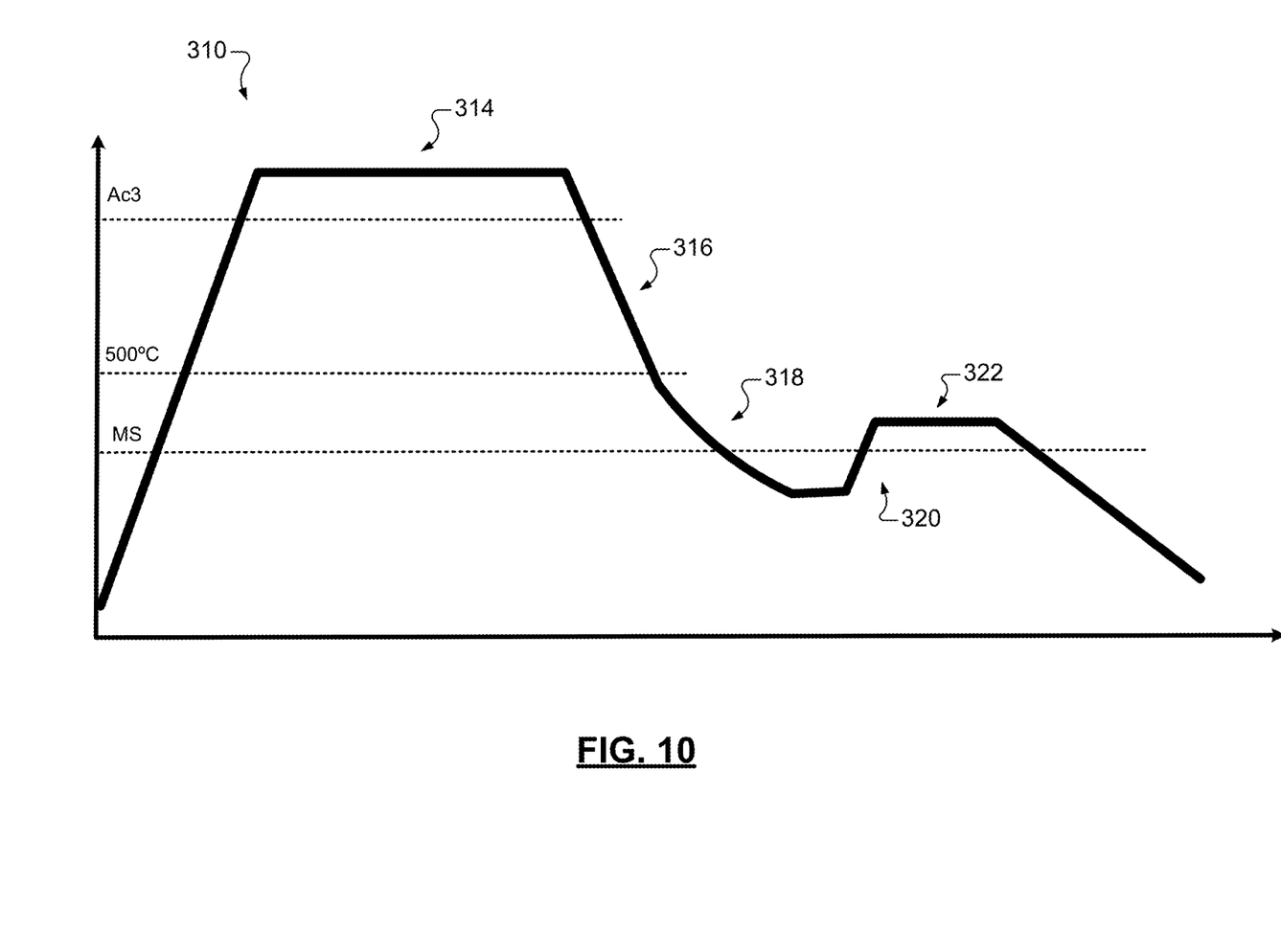
FIG. 10 illustrates an example of a method for manufacturing UHSS according to the present disclosure.

Referring now to FIG. 10, a method 310 is shown for manufacturing UHSS sheet. The temperature of the UHSS sheet is increased to 930° C. and soaked for 340 s as shown at 314. Then, the UHSS sheet is gas cooled at 316. The gas cooling rate may initially occur at a first predetermined cooling rate in a range from 2 to 15° C./s. As the UHSS sheet cools, the cooling rate may decrease at 318 to a second predetermined cooling rate or a variable cooling rate in a range from 0.1 to 15° C./s. The UHSS sheet is cooled to a temperature in a range from 250° C. to 400° C. Then, the UHSS sheet is heated at 320 to the hot dip galvanizing temperature (e.g., a temperature in a range from 430° C. to 560° C.). At 322, hot dip galvanizing is performed. After hot dip galvanizing, the UHSS sheet is quenched to room temperature. In this example, the UHSS sheet has a yield strength of 1207±5.6 MPa, ultimate tensile strength of 1550 MPa±16 MPa, total elongation (TEL) of 9.7±0.4%, bending angle of 62.6±0.4°, and retained austenite of 6.28±0.32%.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A coated steel sheet comprising:
    a steel sheet comprising iron (Fe), carbon (C) in a range from 0.05% to 0.35 wt. %, manganese (Mn) in a range from 0.1% to less than 2 wt. %, chromium (Cr) in a range from 1.2% to 6.0 wt. %, silicon (Si) in a range from 0.01% to less than 0.6 wt. %, aluminum (Al) in a range from 0.5% to 1.3 wt. %, vanadium (V) in a range from 0.01% to 0.5 wt. %, niobium (Nb) in a range from 0.01% to 0.2 wt. %, and titanium (Ti) in a range from 0.01% to 0.3 wt. %; and
    a zinc coating formed on an outer surface of the steel sheet, and
    wherein a microstructure of the steel sheet comprises martensite in a range from 70-99 vol. %, austenite in a range from 3-20 vol. %, bainite in a range from 0-20 vol. %, ferrite in a range from 0-10 vol. %, and Cr-enriched carbide in a range from 0.1% to 10 vol. %, and wherein the Cr-enriched carbide includes Cr in a range from 10% to 51 wt. % and carbon (C) in a range from 49 to 90 wt. %.

2. The coated steel sheet of claim 1, wherein a sum of a weight of the manganese (Mn) and 3 times a weight of the silicon Si is less than 5 wt. %.

3. The coated steel sheet of claim 1, wherein a sum of a weight of the aluminum (Al) and the silicon (Si) is greater than 1.0 wt. %.

4. The coated steel sheet of claim 1, further comprising one or more materials selected from the group consisting of tin (Sn), copper (Cu), molybdenum (Mo), and/or nickel (Ni).

5. The coated steel sheet of claim 4, wherein the tin (Sn) is less than 0.1 wt. %, the copper (Cu) is less than 0.5 wt. %, the molybdenum (Mo) is less than 0.5 wt. %, and/or the nickel (Ni) is less than 0.5 wt. %.

6. The coated steel sheet of claim 1, wherein the wt % of the chromium (Cr) is greater than the wt % of the manganese (Mn).

7. A coated steel sheet comprising:
    a steel sheet comprising iron (Fe), carbon (C) in a range from 0.05% to 0.35 wt. %, manganese (Mn) in a range from 0.1% to less than 2 wt. %, chromium (Cr) in a range from 1.2% to 6.0 wt. %, silicon (Si) in a range from 0.5% to 1.3 wt. %, aluminum (Al) in a range from 0.01% to less than 0.6 wt. %, vanadium (V) in a range from 0.01% to 0.5 wt. %, niobium (Nb) in a range from 0.01% to 0.2 wt. %, and titanium (Ti) in a range from 0.01% to 0.3 wt. %; and
    a zinc coating formed on outer surfaces of the steel sheet, and
    wherein a microstructure of the steel sheet comprises martensite in a range from 70-99 vol. %, austenite in a range from 3-20 vol. %, bainite in a range from 0-20 vol. %, ferrite in a range from 0-10 vol. %, and Cr-enriched carbide in a range from 0.1% to 10 vol. %, and wherein the Cr-enriched carbide includes Cr in a range from 10% to 51 wt. % and carbon (C) in a range from 49 to 90 wt. %.

8. The coated steel sheet of claim 7, wherein a sum of a weight of the manganese (Mn) and 3 times a weight of the silicon Si is less than 5 wt. %.

9. The coated steel sheet of claim 7, wherein a sum of a weight of the aluminum (Al) and the silicon (Si) is greater than 1.0 wt. %.

10. The coated steel sheet of claim 7, further comprising one or more materials selected from the group consisting of tin (Sn), copper (Cu), molybdenum (Mo), and/or nickel (Ni).

11. The coated steel sheet of claim 10, wherein the tin (Sn) is less than 0.1 wt. %, the copper (Cu) is less than 0.5 wt. %, the molybdenum (Mo) is less than 0.5 wt. %, and/or the nickel (Ni) is less than 0.5 wt. %.

12. A method of manufacturing a hot dip galvanized high strength steel sheet, comprising:
    heating a steel sheet to a temperature in a predetermined range from 800° C. to 950° C. for a soaking period, wherein the steel sheet comprises one of
        a first composition comprising iron (Fe), carbon (C) in a range from 0.05% to 0.35 wt. %, manganese (Mn) in a range from 0.1% to less than 2 wt. %, chromium (Cr) in a range from 1.2% to 6.0 wt. %, silicon (Si) in a range from 0.01% to less than 0.6 wt. %, aluminum (Al) in a range from 0.5% to 1.3 wt. %, vanadium (V) in a range from 0.01% to 0.5 wt. %, niobium (Nb) in a range from 0.01% to 0.2 wt. %, and titanium (Ti) in a range from 0.01% to 0.3 wt. %; and
        a second composition comprising iron (Fe), carbon (C) in a range from 0.05% to 0.35 wt. %, manganese (Mn) in a range from 0.1% to less than 2 wt. %, chromium (Cr) in a range from 1.2% to 6.0 wt. %, silicon (Si) in a range from 0.5% to 1.3 wt. %, aluminum (Al) in a range from 0.01% to less than 0.6 wt. %, vanadium (V) in a range from 0.01% to 0.5 wt. %, niobium (Nb) in a range from 0.01% to 0.2 wt. %, and titanium (Ti) in a range from 0.01% to 0.3 wt. %;
    after the soaking period, cooling the steel sheet using gas cooling having a cooling rate in a predetermined range from 2° C./s to 15° C./s to a first predetermined temperature less than or equal to a second predetermined temperature; and
    hot dip galvanizing the steel sheet at the second predetermined temperature to form a zinc coating, and
    wherein a microstructure of the steel sheet comprises martensite in a range from 70-99 vol. %, austenite in a range from 3-20 vol. %, bainite in a range from 0-20 vol. %, ferrite in a range from 0-10 vol. %, and Cr-enriched carbide in a range from 0.1% to 10 vol. %, and wherein the Cr-enriched carbide includes Cr in a range from 10% to 51 wt. % and carbon (C) in a range from 49 to 90 wt. %.

13. The method of claim 12, wherein the soaking period is in a range from 1 s to 10 ks.

14. The method of claim 12, wherein the soaking period is in a range from 200 s to 500 s.

15. The method of claim 12, wherein heating the steel sheet is performed in an atmosphere selected from a group consisting of: the group consisting of molecular nitrogen ($N_2$), and a mixture of $N_2$ and molecular hydrogen $H_2$.

16. The method of claim 12, wherein the first predetermined temperature is equal to the second predetermined temperature.

17. The method of claim 12, wherein the first predetermined temperature is less than the second predetermined temperature.

18. The method of claim 17, wherein the first predetermined temperature is in a range from 250° C. to 400° C.

19. The method of claim 17, further comprising, after gas cooling, heating the steel sheet to the second predetermined temperature.

20. The method of claim 12, wherein:
   a sum of a weight of the manganese (Mn) and 3 times a weight of the silicon Si is less than 5 wt. %; and
   a sum of a weight of the aluminum (Al) and the silicon (Si) is greater than 1.0 wt. %.

\* \* \* \* \*